(12) United States Patent
Hendrix et al.

(10) Patent No.: US 7,848,020 B2
(45) Date of Patent: Dec. 7, 2010

(54) THIN-FILM DESIGN FOR POSITIVE AND/OR NEGATIVE C-PLATE

(75) Inventors: Karen D. Hendrix, Santa Rosa, CA (US); Kim L. Tan, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 321 days.

(21) Appl. No.: 11/753,946

(22) Filed: May 25, 2007

(65) Prior Publication Data

US 2007/0285601 A1 Dec. 13, 2007

Related U.S. Application Data

(60) Provisional application No. 60/803,735, filed on Jun. 2, 2006, provisional application No. 60/823,326, filed on Aug. 23, 2006.

(51) Int. Cl.
*G02B 1/10* (2006.01)
(52) U.S. Cl. ...................... 359/582; 359/580
(58) Field of Classification Search ............. 359/577, 359/582, 580, 588
See application file for complete search history.

(56) References Cited

U.S. PATENT DOCUMENTS

| | | | |
|---|---|---|---|
| 4,312,570 A | 1/1982 | Southwell | 359/488 |
| 4,536,063 A | 8/1985 | Southwell | |
| 5,196,953 A | 3/1993 | Yeh et al. | 349/119 |
| 5,912,762 A | 6/1999 | Li et al. | 359/352 |
| 6,081,498 A | 6/2000 | Yoo et al. | 369/112.21 |
| 6,590,707 B1 | 7/2003 | Weber | 359/498 |
| 7,035,192 B2 | 4/2006 | Kitaoka et al. | 369/112.01 |
| 7,123,416 B1 * | 10/2006 | Erdogan et al. | 359/589 |
| 7,170,574 B2 | 1/2007 | Tan et al. | 349/117 |
| 7,203,001 B2 | 4/2007 | Deng et al. | 359/486 |

(Continued)

FOREIGN PATENT DOCUMENTS

EP    1542044    6/2005

(Continued)

OTHER PUBLICATIONS

Laser Focus World Web article: Kim Tan, Karen Hendrix, and Paul McKenzie, "Optical Fabrication: Thin films provide wide-angle correction for waveplate components" Mar. 2007: http://www.laserfocusworld.com/display_article/286513/12/ARTCL/none/Feat/OPT.

(Continued)

*Primary Examiner*—Joshua L Pritchett
(74) *Attorney, Agent, or Firm*—Matthew A. Pequignot; Pequignot + Myers LLC

(57) ABSTRACT

Thin-film coatings, which for example have alternating layers of high and low refractive index materials, are shown to function as both positive and negative C-plates, in dependence upon the incident radiation. In particular, the shape of the retardance versus angle of incidence profile is found to be determined, at least in part, by the phase thickness of the thin film coating (i.e., the optical thickness in terms of the wavelength of the incident radiation, which may, for example, be expressed in degrees, radians, or as the number of quarter wavelengths). These thin film coatings are optionally integrated into anti-reflection coatings, thin film interference filters and/or other components to improve efficiency and/or functionality.

31 Claims, 12 Drawing Sheets

U.S. PATENT DOCUMENTS

| | | | |
|---|---|---|---|
| 2002/0021649 A1 | 2/2002 | Yoo et al. | 369/112.1 |
| 2003/0227861 A1 | 12/2003 | Kim et al. | 369/112.15 |
| 2004/0032815 A1 | 2/2004 | Kim et al. | 369/112.26 |
| 2004/0099972 A1* | 5/2004 | Morris et al. | 264/1.32 |
| 2004/0120242 A1 | 6/2004 | Kim et al. | 369/112.17 |
| 2004/0141122 A1* | 7/2004 | Nakagawa | 349/117 |
| 2004/0246871 A1 | 12/2004 | Kim et al. | 369/112.01 |
| 2004/0246876 A1 | 12/2004 | Kim et al. | 369/112.23 |
| 2005/0057714 A1 | 3/2005 | Jeon et al. | 349/122 |
| 2005/0128391 A1 | 6/2005 | Tan et al. | |
| 2005/0180292 A1 | 8/2005 | Nagashima | 369/112.01 |
| 2005/0213471 A1 | 9/2005 | Taguchi et al. | 369/109.02 |
| 2006/0001969 A1 | 1/2006 | Wang et al. | 359/494 |
| 2006/0028932 A1 | 2/2006 | Nakamura et al. | 369/44.23 |
| 2006/0039265 A1 | 2/2006 | Lee | 369/112.01 |
| 2006/0083145 A1 | 4/2006 | Yoo et al. | 369/112.01 |
| 2006/0126459 A1 | 6/2006 | Moon et al. | 369/44.37 |
| 2006/0268207 A1* | 11/2006 | Tan et al. | 349/117 |
| 2006/0285208 A1 | 12/2006 | Huang | 359/559 |
| 2007/0053271 A1 | 3/2007 | Ryu et al. | 369/112.09 |
| 2007/0070276 A1 | 3/2007 | Tan et al. | 349/117 |
| 2007/0139771 A1 | 6/2007 | Wang et al. | 359/494 |
| 2007/0165308 A1 | 7/2007 | Wang et al. | 359/494 |

FOREIGN PATENT DOCUMENTS

| | | |
|---|---|---|
| EP | 1726987 | 11/2006 |
| EP | 1783520 | 5/2007 |
| JP | 2005327335 | 11/2005 |
| WO | WO2004/061492 | 7/2004 |

OTHER PUBLICATIONS

Karen Hendrix and K.L. Tan, M. Duelli, D.M. Shemo and M. Tilsch, "Birefringent films for contrast enhancement of LCoS projection systems," J. Vac. Sci. Technol. A 24(4), pp. 1546-1551, 2006.

L.I. Epstein, "The Design of Optical Filters" J. of the Opt. Soc. of Am., vol. 42, No. 11, Nov. 1952.

Kitagawa et al, "Form birefringence of SiO2/Ta205 periodic multilayers", Applied Optics, Vo. 24, No. 20, 1985, pp. 3359-3362.

* cited by examiner

THIN-FILM DESIGN FOR POSITIVE AND/OR NEGATIVE C-PLATE

CROSS-REFERENCE TO RELATED APPLICATIONS

This application claims priority from U.S. Provisional Application No. 60/803,735 filed Jun. 2, 2006 and U.S. Provisional Application No. 60/823,326 filed Aug. 23, 2006, both of which are hereby incorporated by reference.

MICROFICHE APPENDIX

Not Applicable.

TECHNICAL FIELD

The present application relates generally to thin films, and in particular, to thin-film coatings designed for providing a positive and/or a negative C-plate component.

BACKGROUND OF THE INVENTION

The use of thin films in anti-reflection coatings and interference filters is well known. With regard to the former, the thickness and refractive index of the one or more thin film layers is selected to decrease light reflected from a substrate. With regard to the latter, the thickness, refractive index, and/or number of layers is selected to provide the desired filter properties.

More recently, there has been increasing interest in using thin films to provide birefringence in optical components. Birefringence, which is characterized by multiple different indices of refraction, causes light having orthogonal linear polarizations (e.g., s and p polarized light) to propagate with different velocities through a medium. The varying velocity results in a phase difference between the two orthogonal polarizations. This phase difference, which is generally termed retardance, can be expressed as a fraction of a wave, either in degrees or nanometers. In general, the magnitude of the retardance will determine the application of the birefringent element. For example, optical components providing a retardance of about a ½ wave (i.e., a half waveplate) are typically used to change the polarization state of linear polarized light. Optical components providing a retardance of about a ¼ wave (e.g., a quarter waveplate) are commonly used for converting linearly polarized light to circularly polarized light, or in reflection for changing the polarization state of linearly polarized light, and/or in various other applications, such as optical disc pickups. Optical components providing a lower magnitude of retardance (e.g., under $\frac{1}{10}$ wave) are typically used to compensate for imperfections in polarization sensitive optical systems (e.g., in LCD projection systems).

In general, birefringent optical components may be characterized as having A-plate, C-plate, or O-plate symmetry. An A-plate is a uniaxial birefringent optical element having its extraordinary axis oriented parallel to the plane of the plate. A C-plate is uniaxial birefringent optical element having its extraordinary axis oriented perpendicular to the plane of the plate (i.e. parallel to the direction of normally incident light). An O-plate is a uniaxial birefringent optical element having its extraordinary axis (i.e., its optic axis or c-axis) oriented at an oblique angle with respect to the plane of the plate. Notably, a C-plate does not provide any net retardation for normal-incident rays (i.e., normal incident light is unaffected by the birefringence). In contrast, rays incident off-axis (i.e., at an angle to the extraordinary axis) experience a net retardation that is proportional to the incident angle. A C-plate is considered to be positive if the retardance increases with angle of incidence and negative if the retardance decreases with angle of incidence. As is referred to in this context, retardance is used interchangeably with retardation, which includes signed phase difference between two orthogonal linear polarization components. A positive C-plate requires positive birefringence and similarly, a negative C-plate requires a negative birefringence.

Birefringent optical components that function as an A-plate are often used to provide/compensate for in-plane retardance, whereas components that function as a C-plate are often used to provide/compensate for out-of-plane retardance. In-plane retardance, expressed as optical path length difference rather than phase difference, refers to the difference between two orthogonal in-plane indices of refraction times the physical thickness of the optical element. Out-of-plane retardance, also expressed as optical path length difference, refers to the difference of the index of refraction along the thickness direction (z direction) of the optical element and one in-plane index of refraction (or an average of in-plane indices of refraction), times the physical thickness of the optical element.

Birefringence in optical components has been traditionally provided by molecularly birefringent crystals, by stretching or bending isotropic materials until isotropy is lost, and/or by applying an electric field to induce anisotropy. As discussed above, there has also been increased interest in using thin-films to provide birefringence in optical components. The use of thin-films is advantageous because it provides an economic alternative, it circumvents reliability problems associated with organic and/or polymeric materials, and it provides additional design flexibility for tailoring for specific applications. For example, while birefringent crystals are highly durable and/or stable compared to their organic and/or polymeric counterparts, the cost of growing and polishing large crystal plates can be significant. In addition, since it is difficult to fabricate a birefringent crystal with a physical thickness less than about 100 microns, these naturally birefringent elements typically are not generally suitable for compensation applications. For example, the C-plate retardance value of a single quartz plate having a thickness of at least 100 microns and a birefringence of 0.009 would be limited to a minimum of 900 nm in the visible region.

Successful attempts at using thin films to provide birefringence have been reported in U.S. Pat. No. 7,170,574 and US. Pat. Appl. No. 20070070276, both of which are hereby incorporated by reference. In these references, thin film coatings are used to fabricate trim retarders for compensating for the inherent birefringence of LCD panels. More specifically, the thin film coatings are used to create a form-birefringent thin-film stack, wherein the optical thickness of the individual layers is much less than the wavelength of the incident light. Conveniently, the form-birefringent (FB) stack, which is highly durable and acts as a −C-plate, can be integrated into an AR coating design (FBAR) to provide a full-function A/−C-plate trim retarder. Unfortunately, due to the layer thickness restrictions, the FBAR can only act as a negative C-plate.

SUMMARY OF THE INVENTION

The instant invention relates to thin film designs, which are not limited to layer thicknesses being much less than the wavelength of incident light, that are durable and that function as a positive and/or a negative C-plate.

In accordance with one aspect of the instant invention there is provided a thin film coating comprising: a multi-layer stack having a basic period including alternating layers of at least two isotropic materials having contrasting refractive indices, the basic period having an equivalent phase thickness of $\pi$ at $\lambda_0$, a physical thickness and refractive index of each layer in the basic period selected such that the multi-layer stack functions as a C-plate at a predetermined wavelength, and such that an equivalent phase thickness of the basic period at the predetermined wavelength is greater than $\pi$.

In accordance with another aspect of the instant invention there is provided a method comprising the step of: depositing a thin film coating on a substrate, the thin film coating comprising: a multi-layer stack having a basic period including alternating layers of at least two isotropic materials having contrasting refractive indices, the basic period having an equivalent phase thickness of $\pi$ at $\lambda_0$, a physical thickness and refractive index of each layer in the basic period selected such that the multi-layer stack functions as a C-plate at a predetermined wavelength, and such that an equivalent phase thickness of the basic period at the predetermined wavelength is greater than $\pi$.

In accordance with another aspect of the instant invention there is provided a thin film coating comprising: a multi-layer dielectric thin film stack having positive C-plate functionality, the multi-layer dielectric thin film stack including a plurality of alternating thin film layers having different refractive indices, a physical thickness and a refractive index of each thin film layer in the multi-layer thin film stack selected for providing a predetermined retardance at a predetermined off-normal angle of incidence at a predetermined wavelength.

In accordance with another aspect of the instant invention there is provided an optical retarder comprising: a birefringent element having an in-plane retardance, the birefringent element supported on a transparent substrate and coupled to one or more thin film coatings, wherein the one or more thin film coatings comprise a multi-layer stack having a basic period including alternating layers of at least two isotropic materials having contrasting refractive indices, the basic period having an equivalent phase thickness of $\pi$ at $\lambda_0$, a physical thickness and refractive index of each layer in the basic period selected such that the multi-layer stack functions as a C-plate at a predetermined wavelength, and such that an equivalent phase thickness of the basic period at the predetermined wavelength is greater than $\pi$.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

As discussed above, thin films are often used in anti-reflection coatings and/or in interference filters (e.g., thin film interference filters). In each case, the thin film coatings typically include at least one layer having a refractive index n and a physical thickness d selected such that the optical thickness (n times d) of the layer is equal to one quarter of the wavelength of the incident radiation. These quarter wave (QW) layers use the principles of interference to obtain the desired optical effects.

Figure 1:
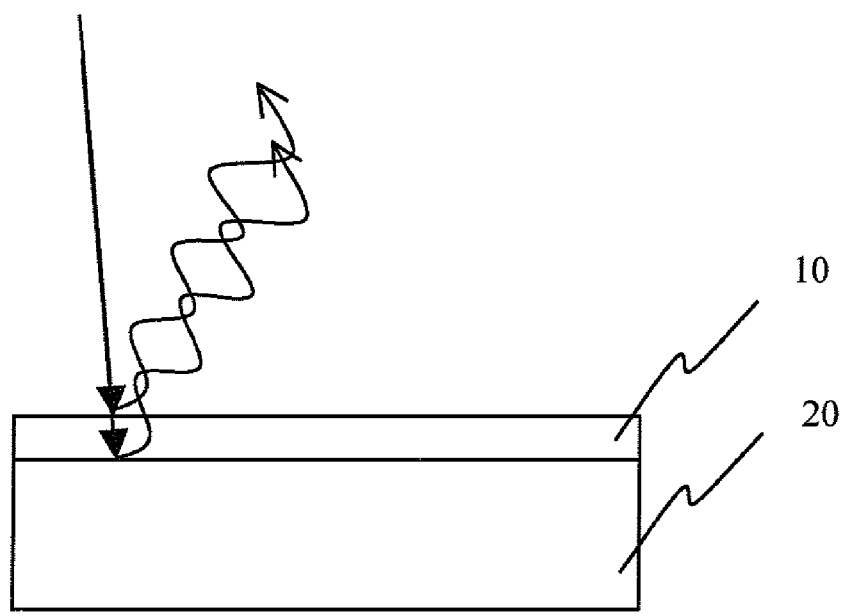
FIG. 1 shows a prior art quarter-wave layer providing destructive interference.

For example, referring to prior art FIG. 1, a thin film layer 10 having a refractive index $n_1$ is shown on a substrate 20 having a refractive index $n_2$. With $n_1$ less than $n_2$, and with the $n_1$ and the thickness of the thin film layer $d_1$ selected to provide an optical thickness equal to a quarter wave of the incident radiation λ, the light reflected from the air/thin-film and the thin-film/substrate interfaces will be exactly 180 degrees out of phase. This 180 degree phase difference results in destructive interference and significantly reduces the amount of reflected radiation at λ.

Accordingly, the simplest anti-reflection coating consists of a single quarter wave layer of a transparent dielectric material deposited directly on a substrate. More specifically, the layer of transparent dielectric material is selected such that it has an index of refraction that is less than the index of refraction of the substrate, and such that it has a physical thickness that allows the optical thickness to be about one quarter of the central wavelength of the spectral region for which the reflectance is to be reduced.

More complex anti-reflection coatings are made by depositing two or more layers of transparent dielectric materials on a substrate. For example, according to one type of anti-reflection coating, a first layer having an index of refraction higher than that of the substrate is deposited on the substrate such that its optical thickness is about one quarter of the central wavelength, while a second layer having an index of refraction lower than that of the substrate is deposited on the first layer such that its optical thickness is also about a quarter of the central wavelength. This type of anti-reflection coating is often referred to as a V-coat design because it generally achieves a zero reflectance at the central wavelength, with sharply increasing reflectance at either side of the central wavelength.

Multi-layer anti-reflection coatings that are more suitable for broadband applications generally have at least three dielectric layers of alternating high and low refractive index materials stacked together. For example, one particularly common broadband anti-reflection coating includes a first layer formed from a material having a high index of refraction and having an optical thickness of about one-eighth of the central wavelength deposited on the substrate, a second layer formed from a material having a low index of refraction and having an optical thickness of about one-eighth the central wavelength deposited on the first layer, a third layer formed from a material having a high index of refraction and having an optical thickness of one half the central wavelength deposited on the second layer, and a fourth layer formed from a material having a low index of refraction and having an optical thickness of one quarter of the central wavelength deposited on the third layer. The optical thicknesses of the first and second layers are selected to provide a combined optical thickness that is about one quarter of the central wavelength of the spectral region for which the reflectance is to be reduced.

Interference filters are generally classified as bandpass, short wavelength pass (SWP), long wavelength pass (LWP), or notch filters. The simplest bandpass filter, which is designed to pass radiation in a given wavelength band and reflect all other wavelengths, simply consists of two partial-reflectors or semi-mirrors separated by a spacer (i.e., is similar to an etalon). In an all-dielectric filter, the partial-reflectors are created using one or more quarter wave layers of dielectric material, and the spacer is half wave layer or multiple half wave layer of transparent dielectric material. For example, according to one embodiment, each partial reflector is formed using alternating layers of high and low refractive index materials, each layer having an optical thickness equal to a quarter wave. Conveniently, these simple all-dielectric structures can be cascaded to form multi-cavity interference filters having steep pass-band transitions. The bandwidth of each interference filter is a function of the reflectance of the quarter-wave stacks in the structure, while the half-wave spacer determines the center wavelength of the pass-band.

The instant invention recognizes that thin-films coatings, which for example have alternating layers of high and low refractive index materials, can also exhibit both positive and negative out-of-plane birefringence, that this birefringence is useful, and that the thin films can be integrated into anti-reflection coatings, thin film interference edge filters and/or other components to improve efficiency and/or functionality. In addition, the instant invention recognizes that the sign and magnitude of the out-of-plane birefringence is determined by the phase thickness of the thin film coating (i.e., the optical thickness in terms of the wavelength of the incident radiation, which may, for example, be expressed in degrees, radians, or as the number of quarter wavelengths).

Figure 2:
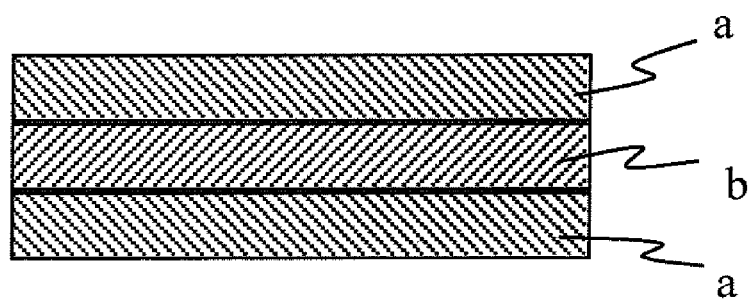
FIG. 2 shows a symmetric stack of the form $(aba)^Q$, where Q is equal to one.

For illustrative purposes, consider the symmetric thin film stack illustrated in FIG. 2. The symmetric stack is of the form $(aba)^Q$, where (aba) is the basic period, material a has a refractive index of $n_a$, material b has a refractive index of $n_b$, and Q is the number of periods in the stack (shown to be one). In general, the refractive index $n_a$ will be considered to be low or high relative to refractive index $n_b$ (i.e., there is contrast between the refractive indices). The symmetric stack is centered at a wavelength $\lambda_0$ (i.e., the physical thicknesses $d_a$ and $d_b$ are selected such that their optical thickness, nd, is defined at $\lambda_0$, for a quarter-wave stack at normal incidence (e.g., nd=$\lambda_0$/4)).

Mathematically, the symmetric stack discussed above can be represented by a single equivalent layer (e.g., the symmetric stack can be considered a Herpin equivalent stack). The equivalent refractive index N and equivalent phase thickness γ of this single layer are calculated using the following equations $$N = \frac{n_a \sin(\gamma)}{\sin 2\varphi_a \cos\varphi_b + \frac{1}{2}(n_a/n_b + n_b/n_a)\cos 2\varphi_a \sin\varphi_b + \frac{1}{2}(n_a/n_b - n_b/n_a)\sin\varphi_b} \quad (1)$$

$$\gamma = Q a\cos\left(\cos 2\varphi_a \cos\varphi_b - \frac{1}{2}(n_b/n_a + n_a/n_b)\sin 2\varphi_a \sin\varphi_b\right) \quad (2)$$

where the phase thicknesses of the individual layers at normal incidence are $\varphi_a=2\pi n_a d_a/\lambda$ and $\varphi_b=2\pi n_b d_b/\lambda$, $d_a$ and $d_b$ are the physical thicknesses of layers a and b in the basic period, and λ is the wavelength where the equivalent refractive index and equivalent phase thickness are being calculated. Note that the equivalent refractive index N is independent of the number of periods, while the equivalent phase thickness γ is the phase thickness of the basic period multiplied by the number of periods Q.

The above equations are for normal incident light. At off-normal incidence, the thin film is birefringent. The P-polarization becomes the extraordinary wave and the S-polarization remains the ordinary wave. In addition, for light incident off-axis, the refractive indices $n_a$ and $n_b$ are replaced with the effective refractive indices for the p-plane (e.g., $n_{effpa}=n_a/\cos\theta_a$) and the s-plane (e.g., $n_{effsa}=n_a \cos\theta_a$), respectively. Similarly, the phase thickness for each layer ($\phi_a$ and $\phi_b$ is replaced with the corresponding non-normal incidence phase thickness equation (e.g, $\phi_a=2\pi n_a d_a \cos\theta_a/\lambda$ and $\phi_b=2\pi n_b d_b \cos\theta_b/\lambda$, where $\theta_a$ and $\theta_b$ are calculated from Snell's law (i.e., $\sin\theta_0 = n_a \sin\theta_a$) and $\theta_0$ is the angle of incidence in air). Also, the quarter-wave optical thickness is defined at angle: $nd\cos\theta=\lambda_0/4$. Accordingly, equation (1) becomes:

$$N_p = \frac{\frac{n_a}{\cos\theta_a}\sin(\gamma_p)}{\sin2\varphi_a\cos\varphi_b + \frac{1}{2}\left(\frac{n_a\cos\theta_b}{n_b\cos\theta_a}+\frac{n_b\cos\theta_a}{n_a\cos\theta_b}\right)\cos2\varphi_a\sin\varphi_b + \frac{1}{2}\left(\frac{n_a\cos\theta_b}{n_b\cos\theta_a}-\frac{n_b\cos\theta_a}{n_a\cos\theta_b}\right)\sin\varphi_b} \quad (3)$$

$$N_s = \frac{n_a\cos\theta_a\sin(\gamma_s)}{\sin2\varphi_a\cos\varphi_b + \frac{1}{2}\left(\frac{n_a\cos\theta_a}{n_b\cos\theta_b}+\frac{n_b\cos\theta_b}{n_a\cos\theta_a}\right)\cos2\varphi_a\sin\varphi_b + \frac{1}{2}\left(\frac{n_a\cos\theta_a}{n_b\cos\theta_b}-\frac{n_b\cos\theta_b}{n_a\cos\theta_a}\right)\sin\varphi_b}$$

and equation (2) becomes:

$$\gamma_p = Q a\cos\left(\cos2\varphi_a\cos\varphi_b - \frac{1}{2}\left(\frac{n_b\cos\theta_a}{n_a\cos\theta_b}+\frac{n_a\cos\theta_b}{n_b\cos\theta_a}\right)\sin2\varphi_a\sin\varphi_b\right) \quad (4)$$

$$\gamma_s = Q a\cos\left(\cos2\varphi_a\cos\varphi_b - \frac{1}{2}\left(\frac{n_b\cos\theta_b}{n_a\cos\theta_a}+\frac{n_a\cos\theta_a}{n_b\cos\theta_b}\right)\sin2\varphi_a\sin\varphi_b\right)$$

The transmitted phase for the p-plane, $\delta_{tp}$, of the coating is $$\tan\delta_{tp} = \frac{(1-r_{p12}r_{p23})\tan\gamma_p}{(1+r_{p12}r_{p23})}, \quad (5)$$

where $r_{p12}$ is given by $$\frac{n_0/\cos\theta_0 - N_p}{n_0/\cos\theta_0 + N_p}, \quad (6)$$

and $r_{p23}$ by $$\frac{N_p - n_s/\cos\theta s}{N_p + n_s/\cos\theta s}, \quad (7)$$

where $n_s$ is the refractive index of the substrate and $\theta_s$ is the ray angle in the substrate.

The transmitted phase for the s-plane, $\delta_{ts}$, has a similar expressions to equation (5), but in this case $r_{s12}$ is $$\frac{n_0\cos\theta_0 - N_s}{n_0\cos\theta_0 + N_s}, \quad (8)$$

and $r_{s23}$ is $$\frac{N_s - n_s\cos\theta s}{N_s + n_s\cos\theta s}. \quad (9)$$

The transmitted net retardance at angle, $\Gamma_t$ in nanometers, defined as the phase difference of the extraordinary wave vs. the ordinary wave, is then expressed as $$\Gamma_t = \frac{(\delta_{tp}-\delta_{ts})\lambda}{2\pi} \quad (10)$$

Figure 3:
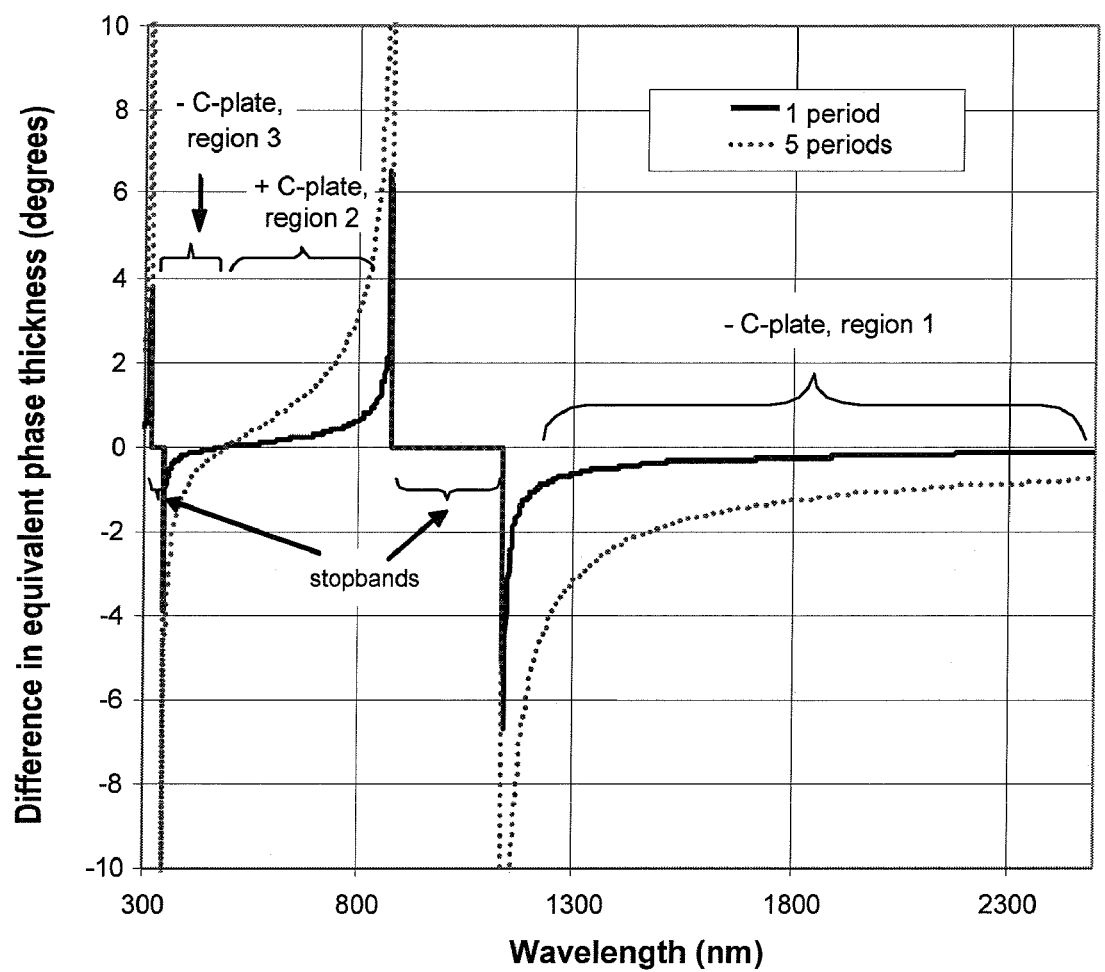
FIG. 3 illustrates the difference in equivalent phase thickness between the s- and p-planes at 15° of the symmetric stacks (0.5 L H 0.5 L) and (0.5 L H 0.5 L)$^5$, each of which is centered at 1000 nm in air on a substrate of index 1.52 (layers matched at normal incidence)

FIG. 3 shows a plot of the theoretical difference in equivalent phase thickness for the s- and p-planes (e.g., $\gamma_p - \gamma_s$) of a symmetric stack similar to that illustrated in FIG. 2. In this symmetric stack, which is herein referred to as 1000 (0.5 L H 0.5 L)$^Q$, material a is a low refractive index material L having an optical thickness equal to 0.5 of a quarter wave at 1000 nm at normal incidence (i.e., ⅛ of a wave; nd=1000/8), material b is a high refractive index material H having an optical thickness corresponding to one quarter wave at 1000 nm at normal incidence. As the layer thicknesses are defined at 1000 nm the stack is considered to be centered at 1000 nm The symmetric stack is assumed to be incident in air and mounted on a substrate with a refractive index of 1.52 (the layers are matched at normal incidence). The L and H materials are assumed to be non-dispersive and to have refractive indices of 1.46 and 2.2, respectively. The equivalent phase thickness difference is calculated for an angle of incidence of 15 degrees. The solid curve is for one period of the stack and the dotted curve is for 5 periods. The stop-bands of this symmetric stack are the regions where the equivalent phase thickness of the basic period is 180° and 540° (or $\pi$ and $3\pi$). Remarkably, at an angle, each of these thin film coatings is predicted to function as a positive C-plate and/or a negative −C-plate, depending on the wavelength of the incoming radiation. The regions where the equivalent phase thickness difference is positive are labelled as positive C-plate regions and the regions where the equivalent phase thickness difference is negative are labelled as negative C-plate regions. The location of these regions does not change with the number of periods of the stack, but the magnitude of the retardance does. The magnitude scales linearly with the number of periods.

Figure 4:
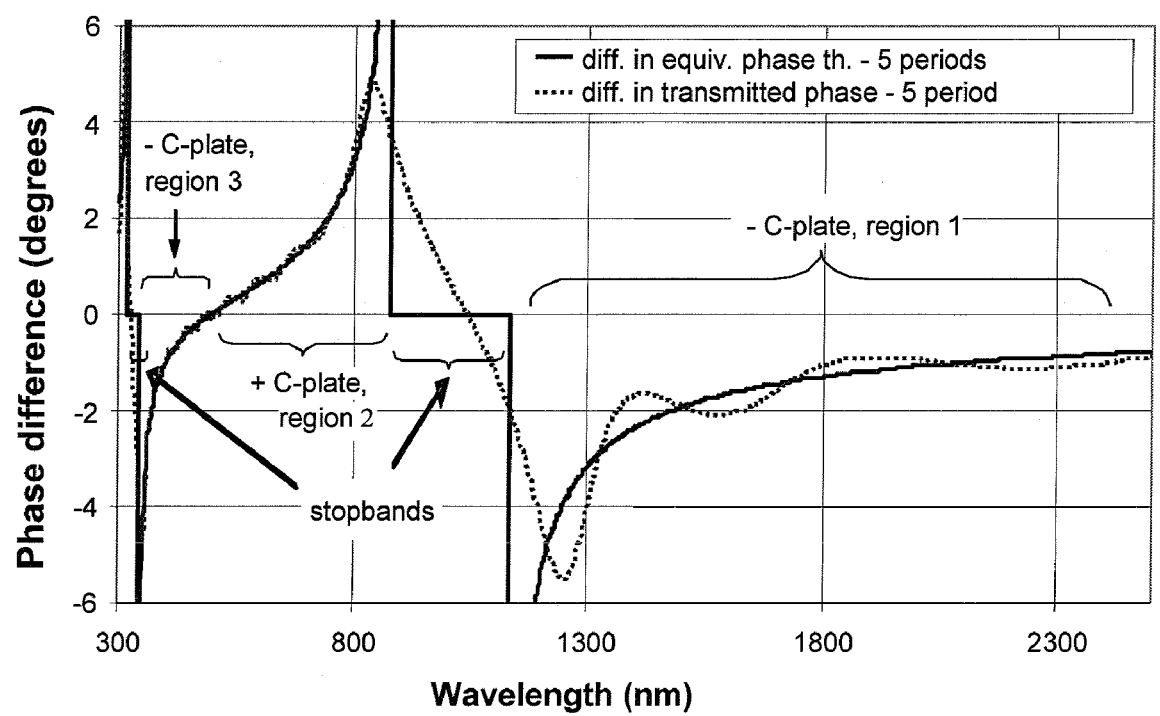
FIG. 4 shows the transmitted retardance at 15 degrees of the 1000 (0.5 L H 0.5 L)$^5$ stack relative to the difference in the equivalent phase thickness shown in FIG. 3.

In FIG. 4, the theoretical transmitted retardance of the 1000 (0.5 L H 0.5 L)$^5$ stack, calculated with a matrix-based thin-film computation algorithm, is plotted along with the difference in the equivalent phase thickness shown in FIG. 3, at 15 degrees. The positive and negative retardance regions coincide with the positive and negative C-plate regions determined from the phase thickness difference of the equivalent stack. Notably, the transmitted retardance is predicted to vary from about 10 nm at 850 nm to almost −20 nm at 1225 nm, for radiation incident at 15 degrees.

Advantageously, the positive C-plate functionality is provided solely by the thin-film structure, which in this embodiment includes a stack of thin film layers having alternating high and low refractive indices. Accordingly, the thin film coating of the instant invention can be fabricated from conventionally isotropic materials (e.g., inorganic dielectrics) deposited in dense micro-layers without voids and without the problems associated with voids (e.g., delamination, the collapsing of columns and/or the filling of voids with water). For example, when the isotropic materials are all inorganic in nature, the resulting thin film will have a positive C-plate component and will be highly durable (e.g., will withstand high light flux and high temperatures for extended periods of time and mechanical handling).

Figure 5:
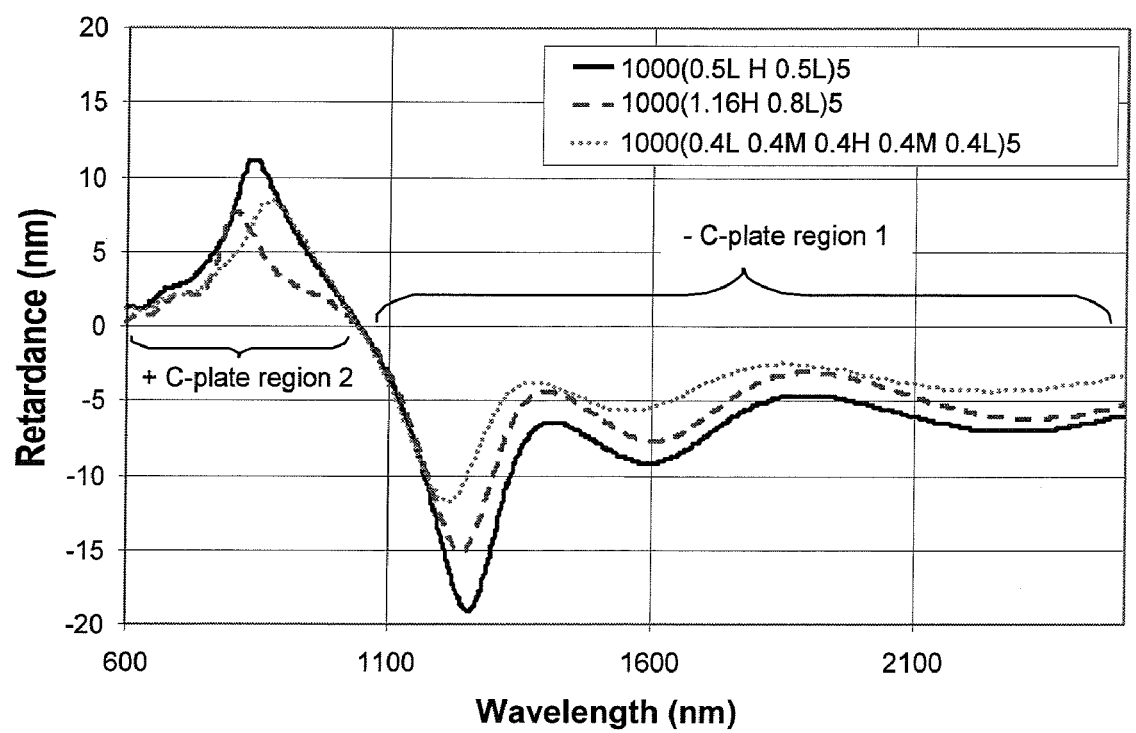
FIG. 5 shows the transmitted retardance at 15 degrees of the 1000 (0.5 L H 0.5 L)$^5$ stack, relative to the transmitted retardance at 15 degrees of the non-symmetric stack 1000 (1.16 H 0.8 L) and the transmitted retardance at 15 degrees of the three material symmetric stack 1000 (0.4 L 0.4 M 0.4 H 0.4 M 0.4 L)$^5$.

In FIG. 5, the theoretical transmitted retardance of the 1000 (0.5 L H 0.5 L)$^5$ stack at 15 degrees incidence is compared with the theoretical transmitted retardance of a non-symmetric stack 1000 (1.16 H 0.8 L)$^5$ and a three material stack 1000 (0.4 L 0.4 M 0.4 H 0.4 M 0.4 L)$^5$ where the non-dispersive index of the medium index material, M, is 1.8. For these three stacks, the phase thickness of the basic period at normal incidence is equal to π at approximately the same wavelength: 979 nm, 968 nm and 983 nm, respectively.

Advantageously, FIG. 5 shows that the positive C-plate design is achieved when the basic period (i.e., the repeating unit) includes only two layers, when the basic period is non-symmetric, and/or when the basic period includes more than two materials (i.e., for various periodically stratified media). Notably, the positive and negative retardance regions are similar for each of the designs shown in FIG. 5.

Further advantageously, FIG. 5 shows that the thin film coating in accordance with the instant invention exhibits significant out-of-plane birefringence with only a relatively small number of alternating thin-film layers of contrasting refractive index materials stacked together (e.g., 15-25 layers). This is in direct contrast to prior art FBAR coatings, which require a large number of alternating high/low index thin-film layers having thicknesses at a fraction of the operating wavelength (e.g., greater than 50 to up to about 2000 layers). Notably, a thin film coating having fewer, thicker layers is simpler to manufacture than a thin film coating having more, thinner layers.

Referring again to FIG. 3, and recalling that the equivalent phase thickness of the basic period has been designed such that it is equal to π near 1000 nm, it is also possible to discuss the transmitted retardance in terms of equivalent phase thickness. For example, in region 1 the equivalent phase thickness of the basic period is less than π, in region 2 the equivalent phase thickness of the basic period is greater than π but less than 2π, and in region 3 the equivalent phase thickness of the basic period is greater than 2π but less than 3π and similarly for other regions (towards short wavelength) that are not shown.

FIGS. 6A, 6B, 6C, and 6D show the theoretical retardance versus incident angle for various incident wavelengths (e.g., 1500 nm, 650 nm, 450 nm, and 310 nm, respectively) for the above described 1000 (0.5 L H 0.5 L)$^5$ design. Notably, each of these wavelengths corresponds to a different phase thickness and a different region in FIG. 3. For example, 1500 nm is in region 1 (corresponding to a −C-plate and an equivalent phase thickness less than π), 650 nm is in region 2 (corresponding to a +C-plate and an equivalent phase thickness greater than π but less than 2π), 450 nm is in region 3 (corresponding to a −C-plate and an equivalent phase thickness greater than 2π but less than 3π), and 310 nm, which is in the unlabeled region, appears to correspond to a +C-plate and an equivalent phase thickness greater than 3π but less than 4π.

Figure 6A:
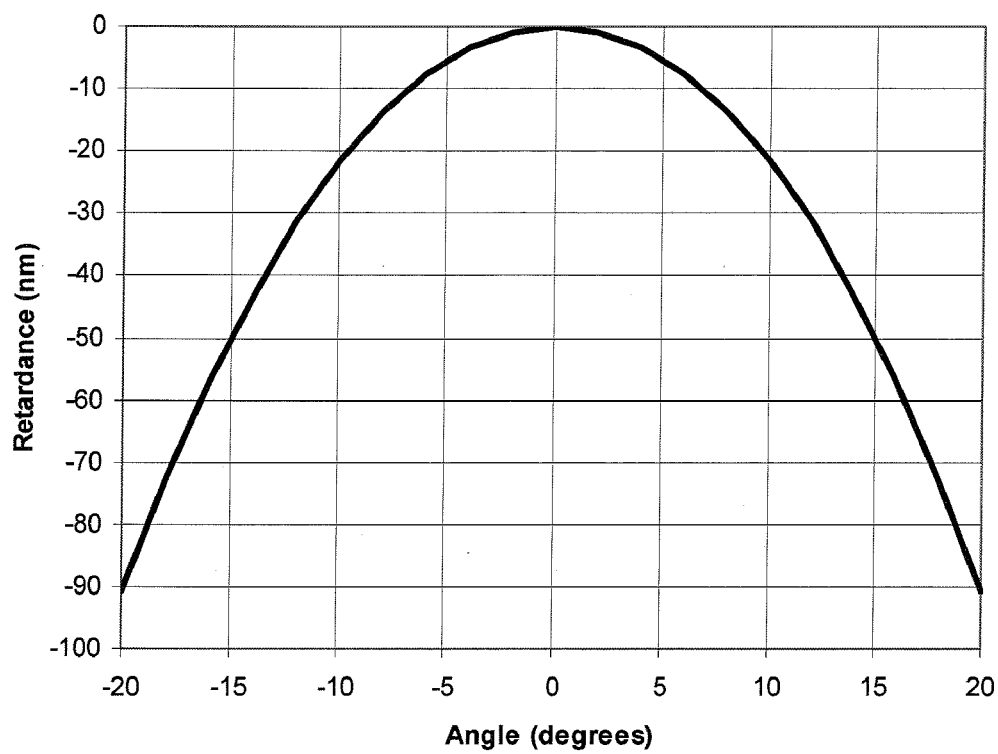
FIG. 6A shows the transmitted retardance versus angle of incidence at 1500 nm for the symmetric stack 1000 (0.5 L H 0.5 L)$^5$ and illustrates that the thin film stack functions as a negative C-plate of −1680 nm at this wavelength.

Referring to FIG. 6A, it is confirmed that the retardance decreases as the angle of incidence moves away from normal incidence and that the thin film stack acts as a negative C-plate in this region (i.e., region 1, where the equivalent phase thickness of the basic period is 21 π). In fact, in this region, the physical layer thicknesses of the design example (e.g., $d_a$=86 nm and $d_b$=114 nm) are less than the wavelength of incident light. For layers with thicknesses much less than the wavelength of light, the stack is a form birefringent stack that can be described by zeroth order effective media theory (EMT). The design of a negative C-plate coating using this type of structure is discussed U.S. Pat. No. 7,170,574 and in K. D. Hendrix, K. L. Tan, M. Duelli, D. M. Shemo and M. Tilsch, "Birefringent films for contrast enhancement of LCoS projection systems," J. Vac. Sci. Technol. A 24(4), pp. 1546-1551, 2006, both of which are hereby incorporated by reference.

Figure 6B:
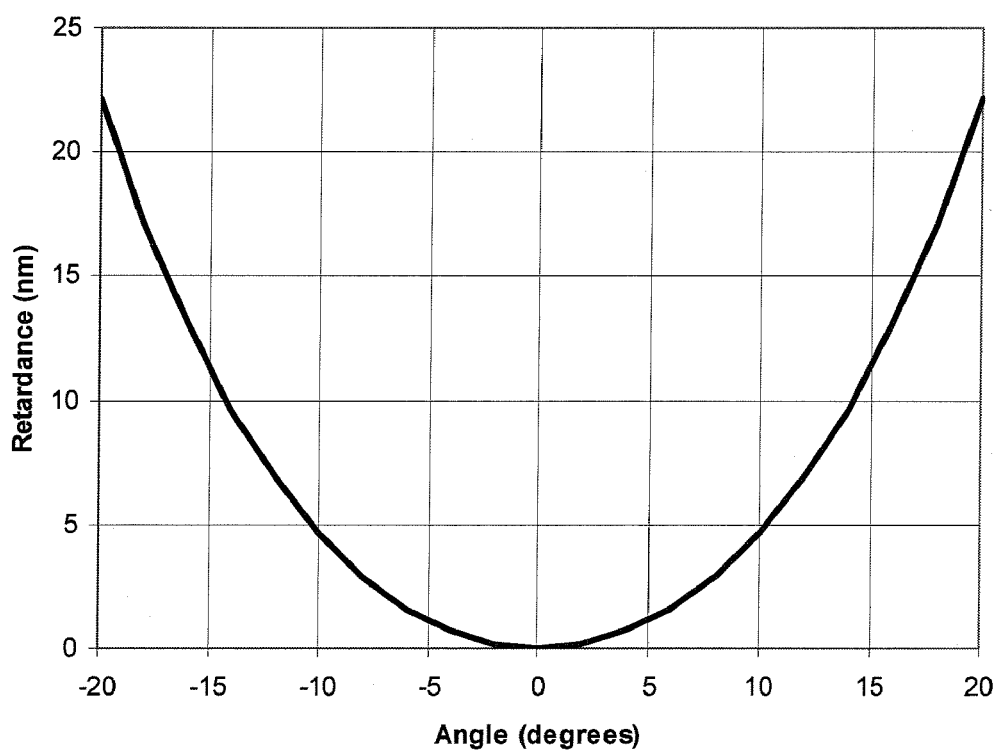
FIG. 6B shows the transmitted retardance versus angle of incidence at 650 nm for the symmetric stack 1000 (0.5 L H 0.5 L)$^5$ and illustrates that the thin film stack functions as a positive C-plate of +396 nm at this wavelength.

Referring to FIG. 6B, it is clear that the retardance increases as the angle of incidence moves away from normal incidence and that the stack acts as a positive C-plate in this region (i.e., region 2, where the equivalent phase thickness of the basic period is less than 2π but greater than π).

Figure 6C:
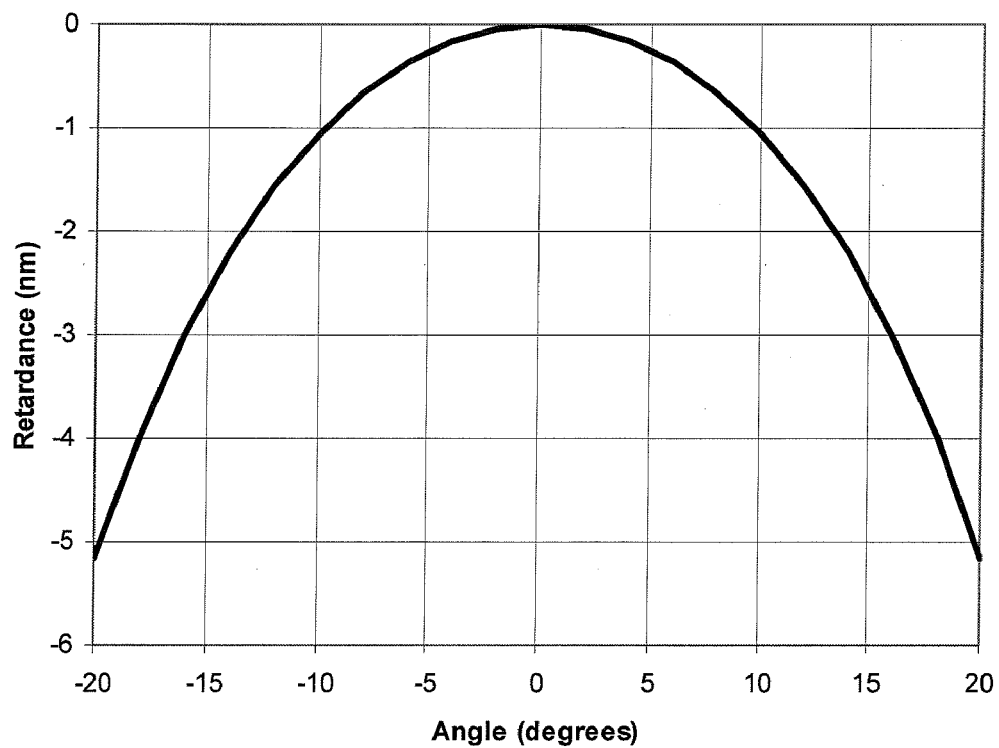
FIG. 6C shows the transmitted retardance versus angle of incidence at 450 nm for the symmetric stack 1000 (0.5 L H 0.5 L)$^5$ and illustrates that the thin film stack functions as a negative C-plate of −82 nm at this wavelength.

Referring to FIG. 6C, it is clear that the retardance decreases as the angle of incidence moves away from normal incidence and that the stack acts as a negative C-plate in this region (i.e., region 3, where the equivalent phase thickness of the basic period is less than 3π but greater than 2π).

Figure 6D:
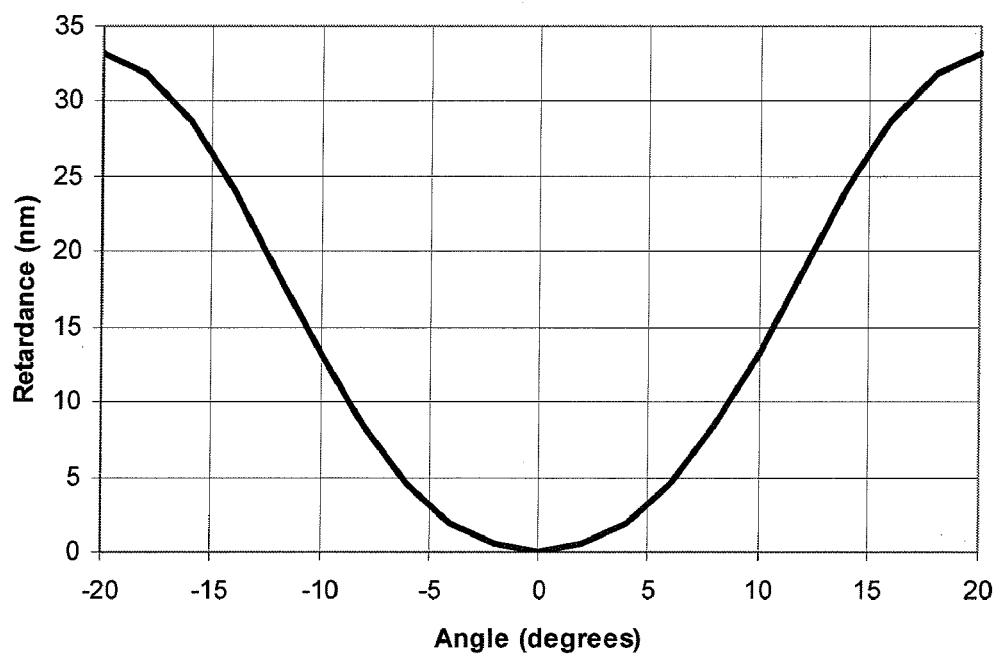
FIG. 6D shows the transmitted retardance versus angle of incidence at 310 nm for the symmetric stack 1000 (0.5 L H 0.5 L)$^5$ and illustrates that the thin film stack functions as a positive C-plate of 1121 nm at this wavelength.

Referring to FIG. 6D, it is clear that the retardance increases as the angle of incidence moves away from normal incidence and that the stack acts as a positive C-plate in this region (i.e., where the equivalent phase thickness of the basic period is less than 4π but greater than 3π).

In summary, the phase thickness, $\gamma_{p,s}$, of the basic period determines whether the thin film stack will act as a positive or negative C-plate according to the following equation $$(m-1)\pi < \gamma_{p,s} < m\pi \tag{11}$$

In particular, the thin film stack will act as a positive C-plate in regions where m is even and as a negative c-plate in regions where m is odd.

Figure 7:
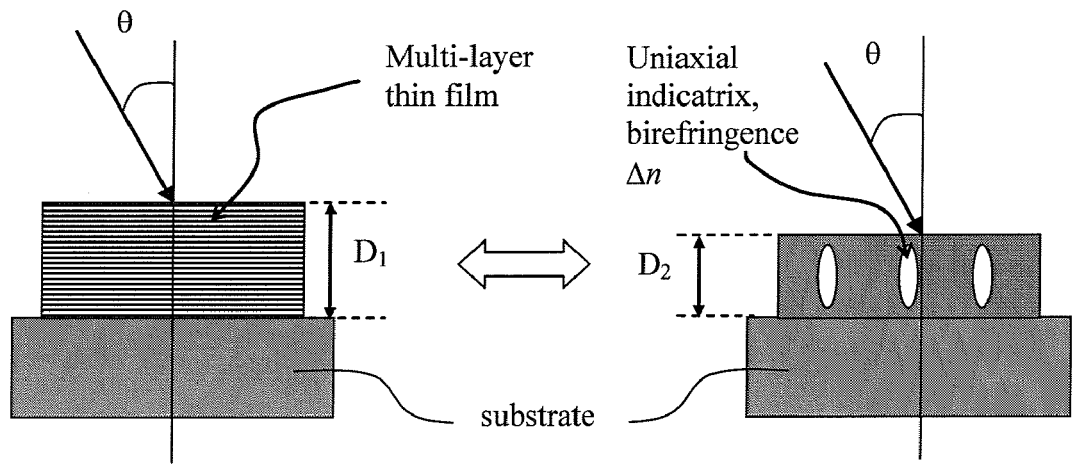
FIG. 7 shows the equivalence of a thin-film stack to a single-layer C-plate retarder.

Throughout the Herpin equivalent phase analysis described above, references have been made to the net retardance (at an oblique angle of incidence) calculated from the transmitted and reflected phase difference of the two orthogonal polarizations (e.g., extraordinary- and ordinary-waves, also P-polarization and S-polarization). In order to allow for some flexibility in thin film designs and material system selection, the off-axis retardation effects of the multi-layer thin film stack are compared to the corresponding off-axis retardation effects of a single-layer birefringent medium. The equivalent single birefringent layer has an identical off-axis retardation profile to the actual thin film design. The uniaxial material indices ($n_o$ and $n_e$) utilized in the equivalent model may be practical material indices (such as those from a liquid crystal mixture) or fictitious material indices. The equivalent material system may or may not possess the same values of average index, effective $n_o$ and $n_e$ indices of the multi-layer thin film stack. The physical thickness of the equivalent layer $D_2$ may also differ from the true overall film thickness $D_1$ of the multi-layer stack. One particular important outcome of this equivalent model, which is shown schematically in FIG. 7, is that the actual thin film design may incorporate one or more dissimilar thin film sub-stacks, such as the (aba)$^Q$ stack immersed in index matching layers (anti-reflection function). The off-axis property of the entire stack is matched to the single-layer, accounting for the repeated stack, whose retardation effect can be analytically analyzed and the AR stack which requires matrix based computation for analyzing the retardation effects.

The eigen-indices of propagation for a single-layer C-plate retarder are given by the expressions as follows, $$\sigma_e(\theta;\lambda) = n_o(\lambda)\sqrt{1 - \frac{\sin^2(\theta)}{n_e(\lambda)^2}} \quad (12)$$

$$\sigma_o(\theta;\lambda) = n_o(\lambda)\sqrt{1 - \frac{\sin^2(\theta)}{n_o(\lambda)^2}} \quad (13)$$

where $\sigma_o$ and $\sigma_e$ are eigen indices of the single layer C-plate at off-axis incidence, $n_o$ and $n_e$ are the intrinsic ordinary and extraordinary indices, respectively, and $\theta$ is the angle of incidence in air for a wavelength of illumination $\lambda$. The net retardation of the C-plate retarder in length units is computed using the index difference and the physical thickness $D_2$, as given by the expression below, $$\Gamma(\theta;\lambda) = [\sigma_e(\theta;\lambda) - \sigma_o(\theta;\lambda)] \times D_2 \quad (14)$$

The C-plate retardance, expressed in length units, is the product of index difference and the physical layer thickness, as given by, $$\Gamma_c(\lambda) = [n_e(\lambda) - n_o(\lambda)] \times D_2 \quad (15)$$

As discussed above, this is out-of-plane retardation expressed as an optical path length difference. Hence, given a net retardance at a pre-determined angle of incidence, the nominal C-plate retardance quantity (in length units) is expressed as, $$\Gamma_c(\lambda) = \frac{\Gamma(\theta;\lambda) \times (n_{eq})^2}{\sin^2(\theta)} \quad (16)$$

where $n_{eq}$ is the equivalent index required to match retardation profile of the actual film to the single layer C-plate retarder, $n_{eq}$ lies between $n_o$ and $n_e$ of the single-layer C-plate retarder, and $n_{eq}$ is approximately $n_e$. For example, the retardation profile of a positive C-plate retarder having $\{n_o, n_e\}$ of $\{1.50, 1.65\}$ at $\lambda$=550 nm is accurately modeled with $n_{eq}$ of 1.60, whereas the retardation profile of a negative C-plate retarder having $\{n_o, n_e\}$ of $\{1.65, 1.50\}$ at $\lambda$=550 nm is accurately modeled with $n_{eq}$ of 1.53. The full dispersion of $n_{eq}$ is obtained with the full dispersion data of $\{n_e, n_o\}$ Using the single-layer C-plate model above and the $n_e$ for the appropriate retardation profile (positive or negative), $\Gamma_c$ has been modeled for the retardance profiles in FIG. 6. For the retardance profile at 1500 nm shown in FIG. 6A, the equivalent single-layer C-plate is −1680 nm. Similarly, the equivalent single-layer C-plate for FIGS. 6B, 6C and 6D are +396 nm, −82 nm and +1121 nm, respectively, Advantageously, the thin film coating of the instant invention is used to introduce a positive and/or a negative C-plate component to a polarization device in either a transmissive or a reflective configuration. Optionally, the C-plate thin film coating is integrated into another type of coating such as an anti-reflection coating, a short wavelength pass (SWP) coating, and a long wavelength pass (LWP) coating, at normal incidence, or at angle, to increase functionality.

Further advantageously, since the positive and negative C-plate functionality is introduced by the alternating layers of high, medium, and/or low refractive index materials, the thin film coating of the instant invention can be fabricated from conventional isotropic materials deposited in dense microlayers without voids and without the problems associated with voids (e.g., the collapsing of columns and/or the filling of voids with water). For example, when the isotropic materials are all dielectric in nature, the C-plate coatings are highly durable and reliable, and can withstand high light flux densities (e.g., above 40 Mlux) and high temperatures (e.g., above 120 degrees Celsius) for extended periods of time (e.g., over 10,000 hours).

Further advantageously, since the optical thickness of the basic period is not limited to being much less than the wavelength of light (as required for a form-birefringent negative C-plate element such as an FBAR) there is additional design flexibility. In fact, the thin film coating in accordance with the instant invention is easily tailored to vary the level of transmitted and/or reflected retardance, so that it is appropriate for the intended application. For example, to increase the magnitude of the retardance the number of repeat optical units can be increased. To change whether the retardance increases or decreases with angle of incidence, the equivalent phase thickness at the wavelength of interest is changed (i.e., the center wavelength $\lambda_0$ is selected in dependence upon a predetermined wavelength at which the thin film stack is to function as a positive and/or negative C-plate). For example, thin film coatings in accordance with the instant invention are expected to provide from 50 to 5000 nm of positive and/or negative C-plate retardance for custom off-axis compensation requirements in the visible and near infra-red regions of the electromagnetic spectrum. Of course, the thin film coatings in accordance with the instant invention will also provide positive and/or negative C-plate retardance for wavelengths outside this range.

Figure 8:
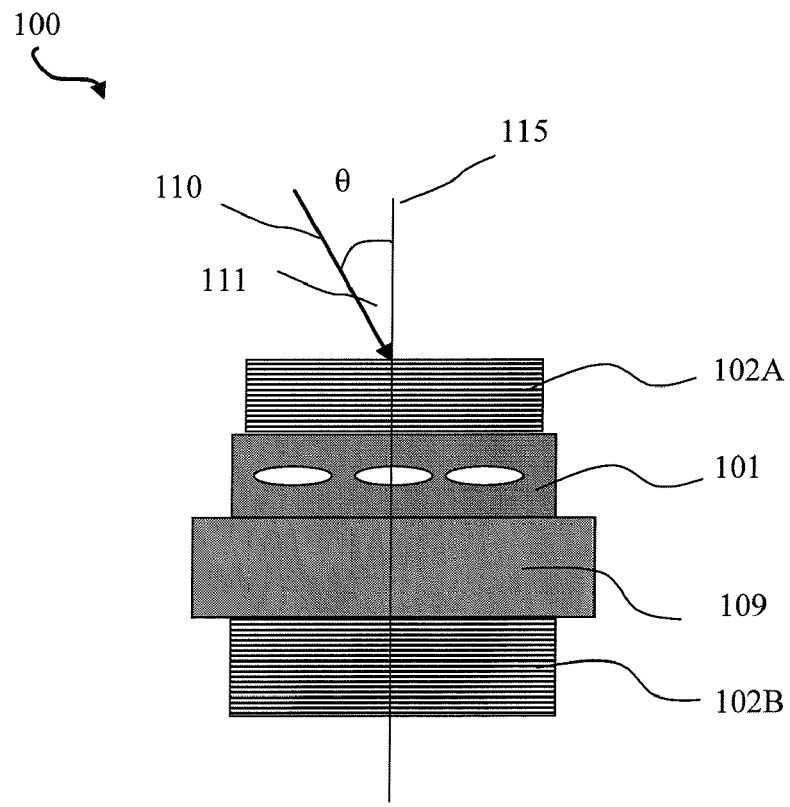
FIG. 8 shows a thin film coating in accordance with one embodiment of the instant invention combined with another retarder element to provide for off-axis retardance profile shaping.

Conveniently, the thin film design of the instant invention is readily coupled to another birefringent element, which for example is either a form birefringent structure or a molecularly birefringent element, having an in-plane retardance. Some examples of suitable in-plane retarders, either configured as an A-plate or O-plate, include stretched polymer film, liquid crystal polymer, birefringent crystals, obliquely evaporated form-birefringent thin film having columnar structures, nano- and micro-structured form-birefringent gratings, and uniaxial and/or biaxial birefringent media. The resulting compound retarder is schematically illustrated in FIG. 8. The compound optical retarder 100 includes an in-plane retarder 101 mounted on a transparent substrate 109. The in-plane retarder 101, which is typically configured as an A-plate or an O-plate, is optionally formed of multiple homogenous retarder layers, disposed on one side or both sides of the substrate. The birefringent classification of the retarder is uniaxial or biaxial; and its birefringence is positive or negative. In general, the in-plane retarder 101 is coated monolithically on the transparent substrate 109 or it is laminated to the substrate 109 with an optical adhesive layer. Optionally, the in-plane retarder includes a cover plate.

Due to the off-axis retardation property of the in-plane retarder 101, an enhancement of the angular response is often required. For example, if the in-plane retarder 101 is a true positive A-plate uniaxial layer, the net linear retardance along its slow-axis rolls off with an increased angle of incidence. Similarly, the net linear retardance of the in-plane retarder 101 along its fast-axis picks up with an increased angle of incidence. The linear retardance profiles of the in-plane retarder 101 for any other azimuthal plane of incidence lies between the extreme profiles of the slow- and fast-axes planes of incidence. An elegant solution to shaping the off-axis profile is the coupling of the in-plane retarder 101 to the thin film coating design of the instant invention. Accordingly, multi-layer thin film stacks 102A and 102B are mounted on both external surfaces of the in-plane retarder 101/substrate 109 assembly. Alternatively, a single multi-layer thin film stack (not shown) is mounted to only one side of the assembly. Notably, the use of two multi-layer stacks allow for coating stress matching, whereas a reflective mode of operation requires only one multi-layer stack. As was discussed previously, the multi-layer thin film coating of the instant invention optionally incorporates other filter functions, such as anti-reflection, edge filtering, short and long band pass etc.

Advantageously, the angular retardance profile is enhanced by the addition of thin film coatings, resulting in a tailored response (including flat retardance profiles vs. angle of incidence). When a ray of light is incident as 110, subtending an angle 111 with the device normal 115, the retardance of this off-axis ray exactly matches the requirement, which may be equal, greater or less than the retardance of the on-axis illumination, with the in-plane retarder optic axis mounted at any required azimuthal plane. According to one embodiment, the resulting enhanced optical retarder is used as a full function A/C optical retarder.

Another application of the thin film coating described in accordance with the instant invention is to increase the field of view of various polarization components that exhibit a variation in retardance with angle of incidence.

For example, consider a 70 nm waveplate used at 785 nm in an ophthalmic instrument. The waveplate uses a liquid crystal polymer (LCP) material with a birefringence $\Delta n$ of about 0.097 at 785 nm, sandwiched between two glass plates in an A-plate configuration (the ordinary and extraordinary axes of the LCP are orthogonal to the optical axis). The waveplate is used in an f/1.6 beam at normal incidence. The incident beam varies ±18 degrees from normal incidence in air. To work acceptably over this angle range, the desired 70 nm of in-plane (A-plate) retardance should not vary by more than 1 nm with angle.

Figure 9:
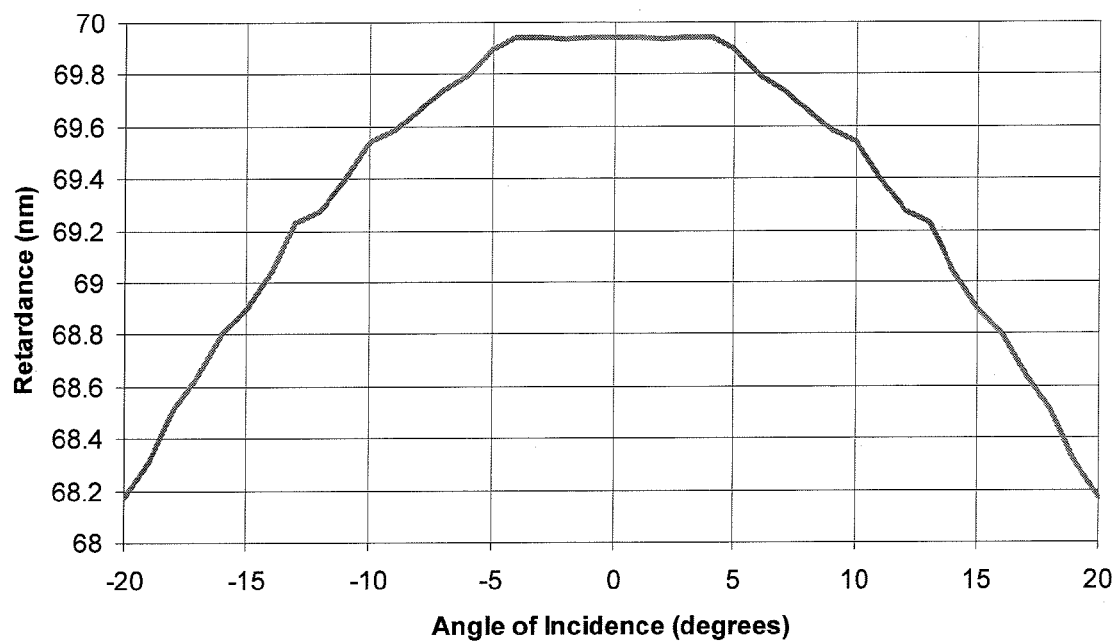
FIG. 9 shows the transmitted retardance versus angle of incidence of a 70 nm A-plate retarder at 785 nm, wherein the slow axis is oriented at an azimuthal angle of zero degrees.

Referring to FIG. 9, the retardance versus angle of incidence for the above-described slow axis orientation of the A-plate of 0 degrees (also parallel to the plane of incidence) is shown to, in fact, decrease with increasing incident angle by more than 1 nm. In particular, the retardance at 18 degrees is about 1.6 nm less than at normal incidence when the slow axis is aligned parallel to the plane of incidence. At ±20 degrees, the retardance is almost 2 nm less than at normal incidence.

To improve the field of view of this waveplate, a thin film coating having a positive C-plate component with a net retardance at 18 degrees of at least 0.6 nm and no greater than 2.6 nm is used to reduce the retardance variation with angle of the waveplate to less than 1 nm. Notably, if the same positive C-plate design is coated on each outer surface of the glass plates, the retardance at 18 degrees for each surface need only be half of the target value as the amount from the two surfaces will be additive. Since each glass plate typically requires an anti-reflection coating at 785 nm, the positive C-plate (PC) coatings are optionally incorporated into the anti-reflection (AR) coatings (i.e., to form PCARs). Alternatively, the positive C-plate coatings are incorporated into other coatings, such LWP or SWP coatings.

For illustrative purposes, consider the thin film stack 1320 (0.6 L 0.7 H 0.6 L). This positive C-plate coating, which is centered at 1320 nm, provides about 0.4 nm of retardance at 18 degrees. In calculating the retardance, the stack is assumed to be in air on a substrate with a refractive index of 1.52, the low refractive index material L is assumed to have a refractive index of 1.46, the high refractive index material H is assumed to have a refractive index of 2.2, and both L and H materials are assumed to be non-dispersive.

Figure 10:
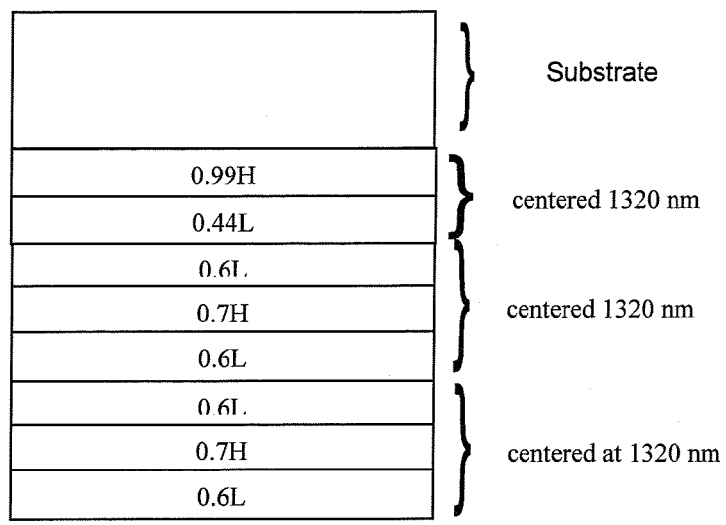
FIG. 10 shows the layer structure of a positive C-plate thin film coating in accordance with one embodiment of the instant invention including two anti-reflection layers between the thin-film stack and the substrate.
Figure 11:
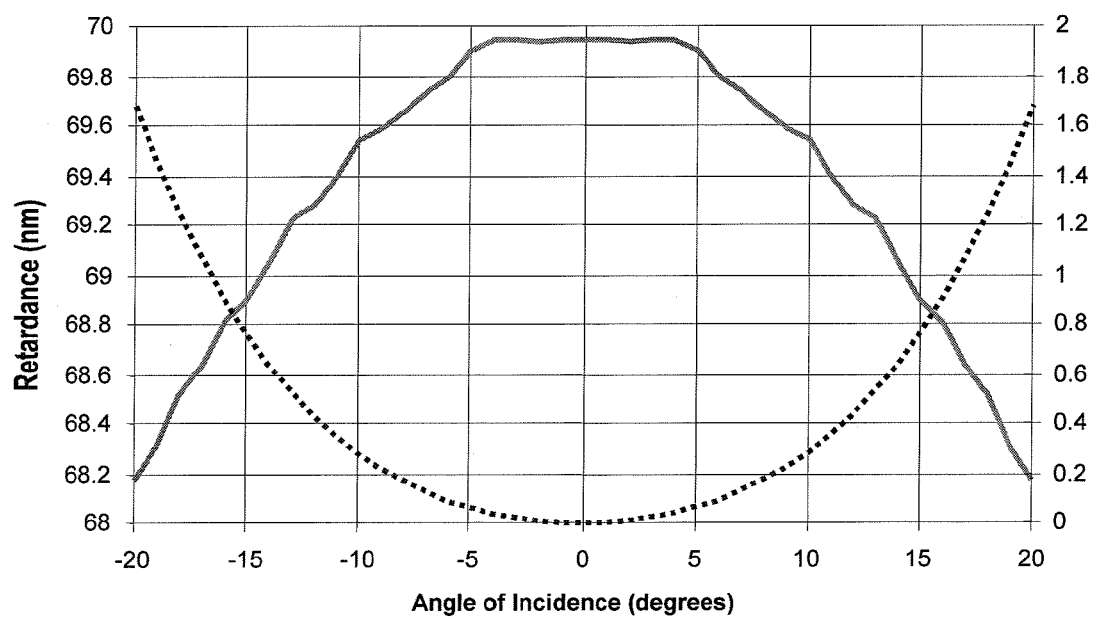
FIG. 11 provides a comparison of the retardance of the positive C-plate AR coating illustrated in FIG. 10 and the retardance of the 70 nm A-plate retarder discussed with reference to FIG. 9.

When this positive C-plate coating stack is incorporated into a two layer anti-reflection coating optimized for reflectance at 785 nm, as illustrated in FIG. 10, the result is a coating design that has reflectance from the glass surface less than 0.04% at 785 nm from 0 to 18 degrees, and transmitted retardance at 18 degrees of 0.62 nm. When both outer glass surfaces are coated, as discussed above, the total transmitted retardance at 18 degrees is 1.24 nm. The total transmitted retardance versus angle of this design coated on both glass surfaces is shown in FIG. 11 (right axis, dotted line), as compared to the retardance of the 70 nm waveplate (left axis, solid line).

Figure 12:
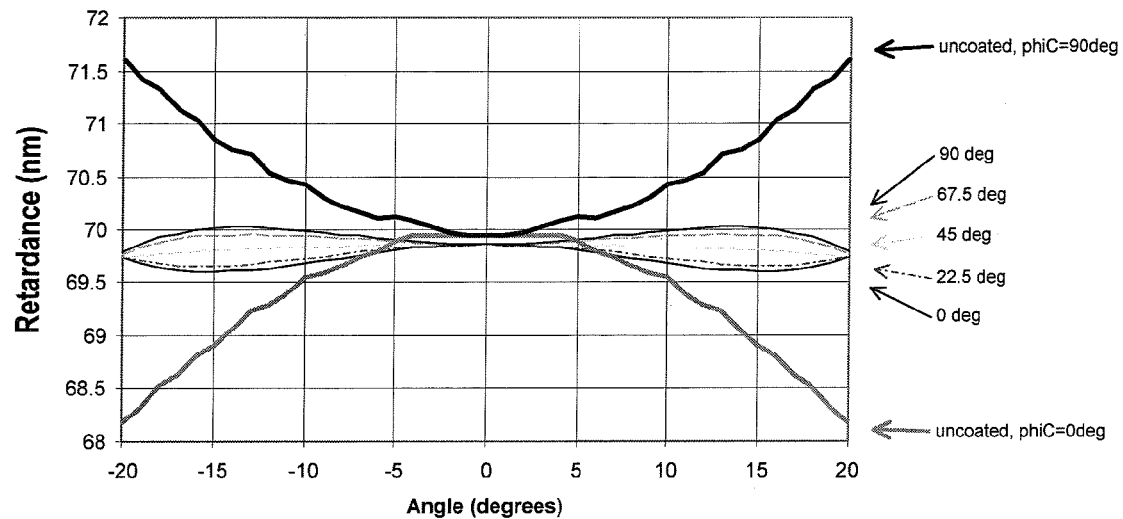
FIG. 12 illustrates theoretical retardance versus angle of incidence for different azimuthal orientations of the 70 nm A-plate slow axis with positive C-plate AR coatings on the outer fused silica surfaces and illustrates that the total retardance variation over the incident f/1.43 beam has been reduced from about 3.5 nm to less than 1 nm.

The total theoretical retardance as a function of angle of incidence for varying slow axis orientations of the A-plate for the laminated LCP structure with the PCARs on the outer surfaces is plotted in FIG. 12. Evidently, the retardance can be kept fairly constant over an incident cone of illumination, increasing the field of view of the polarization component. In particular, the retardance variation over the incident f/1.6 beam has been reduced from about 3 nm to less than 1 nm, and the effective field of view has been increased from about ±10 degrees to about ±20 degrees.

Figure 13:
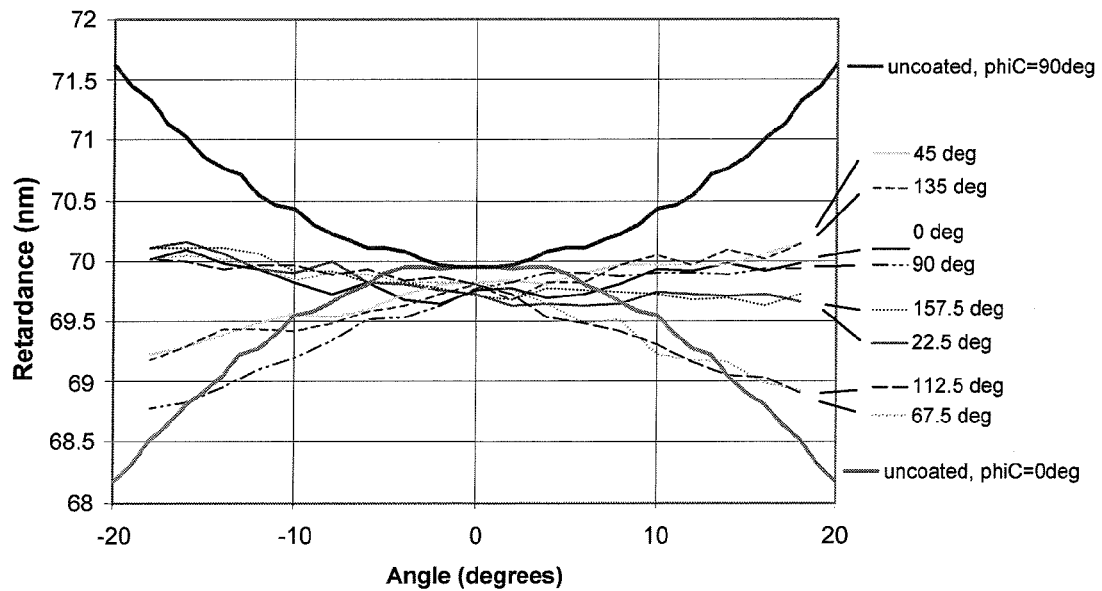
FIG. 13 shows the measured retardance versus angle of incidence for different azimuthal orientations of the 70 nm A-plate slow axis of a waveplate coated with positive C-plate AR coatings on the outer fused silica surfaces, and the theoretical retardance of the uncoated laminated waveplate.

Experimental results for a 70 nm retarder using these designs are given in FIG. 13. The actual variation in the retardance over the measured incidence angle range of ±18 degrees is 1.2 nm, larger than that predicted by the design. The measured retardance data is not symmetrical about normal incidence like the theoretical data in FIG. 12. This may be due to a slight out-of-plane inclination of the A-plate LCP that causes the variation in the measured retardance to be larger than theoretical. Nevertheless, the positive C-plate AR coating does significantly reduce the retardance variation with angle over an incident beam of a waveplate.

Another application of the thin film coating described in accordance with the instant invention is to create an achromatic waveplate. More specifically, positive and/or negative C-plate regions of the thin film coating are used to create a device that has the same magnitude of retardance at two or more wavelengths.

Figure 14:
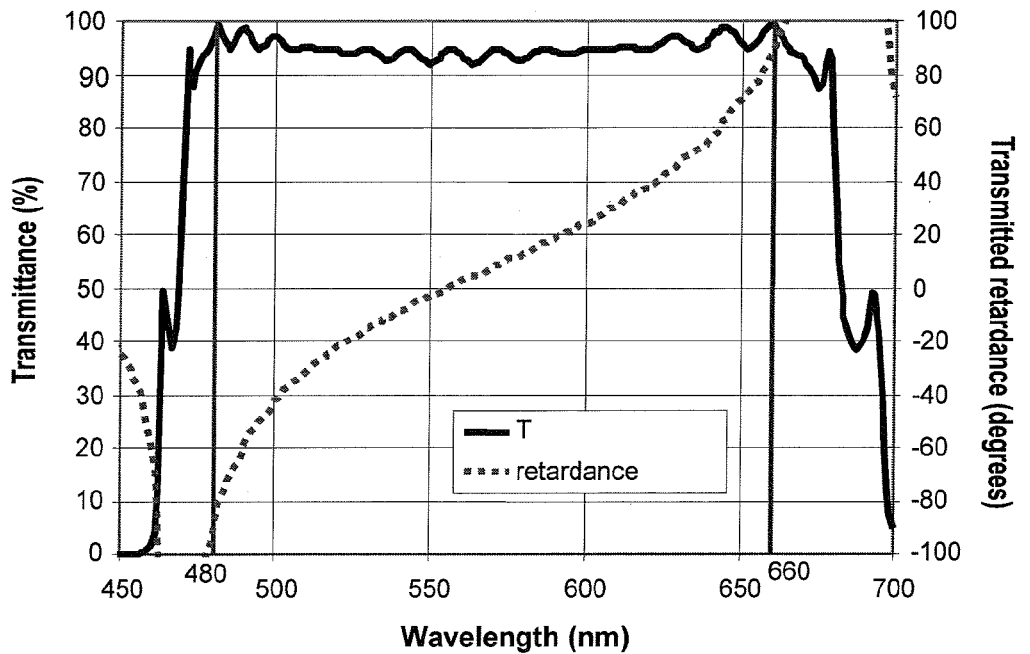
FIG. 14 shows the theoretical transmittance and transmitted retardance at 45 degrees of a design that has high transmittance at 480 nm, 660 nm and +90 or −90 degrees transmitted retardance at these wavelengths.

For example, consider the wave plate including the thin film stack 556 $(2HL2HL2H)^9$ matched at 45 degrees and anti-reflected to have high transmission at 480 and 660 nm. Referring to FIG. 14, the thin film stack 556 $(2HL2HL2H)^9$ is designed such that the region where the equivalent phase thickness of the basic period is less than $4\pi$ but greater than $3\pi$ is located at 660 nm and the region where the equivalent phase thickness of the basic period is less than $5\pi$ but greater than $4\pi$ is located at 480 nm. In addition, the thin film stack is designed such that the transmitted retardance at 660 nm is about +90 degrees, and about −90 degrees at 480 nm, each measured at an angle of incidence of 45 degrees. In other words, the transmitted retardance is the same in magnitude (but opposite in sign) for these two wavelengths. Accordingly, the thin film coating provides a transmissive achromatic quarter-wave plate (for 480 and 660 nm).

In operation, if the plane of the thin film coating is oriented at 45 degrees to the transmission axis, and if the fast/slow axes are oriented azimuthally at 45 degrees to the incoming linearly polarized light, the thin film coating will convert the incoming polarized light to circularly polarized light. Notably, the light at the two wavelengths will have opposite circular orientations (clockwise and counter-clockwise).

Another type of achromatic waveplate fabricated using the thin film coating of the instant invention is a reflective waveplate. For example, the thin film coating having a positive and/or negative C-plate design is optionally incorporated into a reflective filter, such as a high reflector. The reflective waveplate, which affects the polarization as it redirects the light, operates in the stopband of the coating stack. The number of periods is increased until the reflectance is near 100%. Layers are added on top of the reflector to control the phase. These additional layers are optimized to tailor the reflected phase difference to a desired profile across the stopband.

Figure 15:
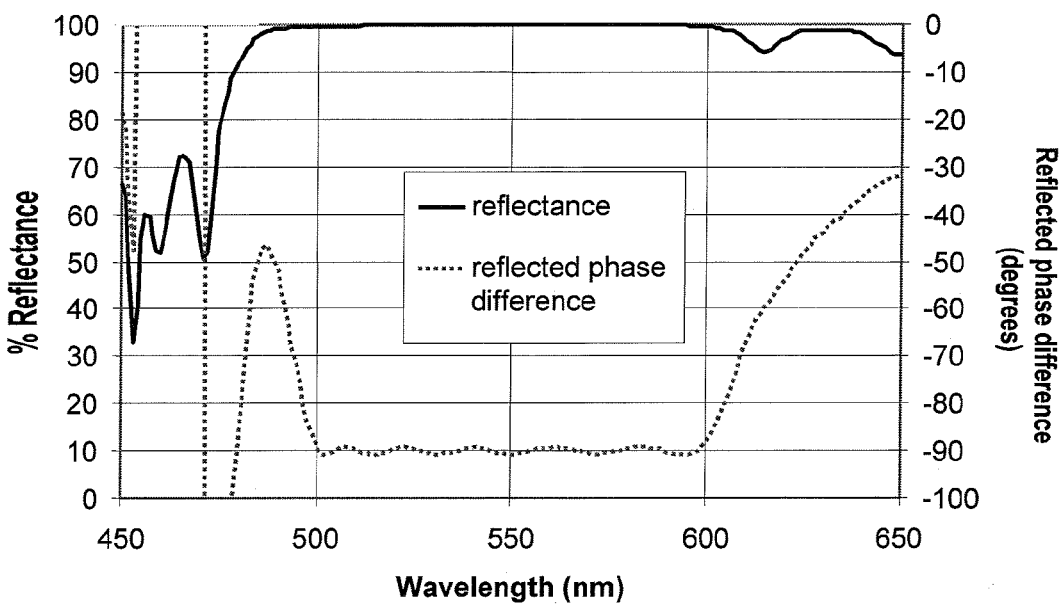
FIG. 15 shows the theoretical reflectance and reflected retardance at 45 degrees of a thin film coating design that is a reflective quarter-wave plate (90 degree retardance) for a band of wavelengths from 500-600 nm.

One embodiment of a reflective achromatic quarter-wave plate is shown in FIG. 15. In this embodiment, the thin film coating includes the reflective multi-layer stack having the formula 535 $(0.5 \text{ H L } 0.5 \text{ H})^{12}$, and a plurality of additional alternating refractive index layers, optimized to provide a relatively flat reflected phase difference profile across the stopband. Light is incident on the waveplate at 45 degrees. The average reflectance is high from about 500-600 nm. Over this same wavelength region, the reflected phase difference has been optimized to be −90 degrees; it is a quarter-wave plate. Linearly polarized light incident at 45 degrees that is oriented azimuthally at 45 degrees to the fast/slow axis of the plate will be converted to circularly polarized light after reflection from the filter.

Figure 16:
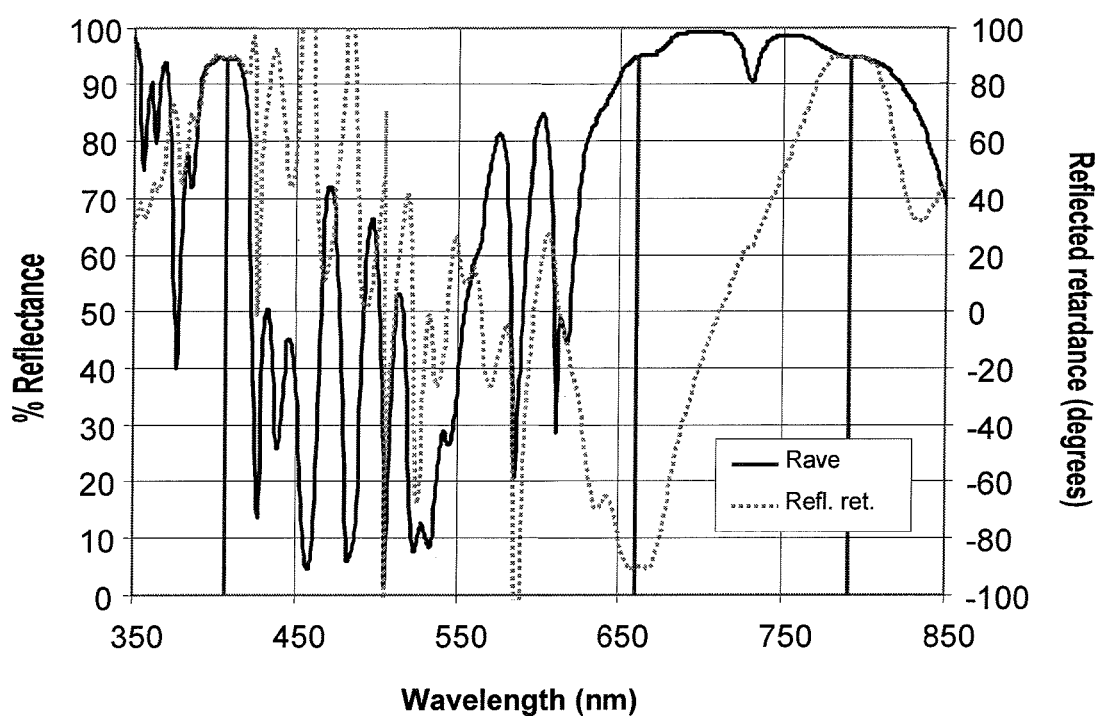
FIG. 16 shows the theoretical reflectance and reflected retardance at 45 degrees of a design that has 90 degree retardance (quarter-wave plate) at three wavelengths: 406 nm, 660 nm and 790 nm, indicated by the vertical lines.

Another embodiment of a reflective achromatic quarter-wave plate is shown in FIG. 16. Three linearly polarized laser lines at 406 nm, 660 nm and 790 nm are incident on the waveplate at 45 degrees. At this angle of incidence, the reflected phase difference at these three laser lines is either −90 or +90 degrees. When operated at 45 degrees incidence with the linearly polarized light oriented azimuthally at 45 degrees to the fast/slow axis of the plate the device acts as a reflective achromatic quarter-wave plate for the three wavelengths.

Another application of the thin film coating described in accordance with the instant invention is for compensating for the residual negative C-plate retardance of an optical component or combination of components.

For example, consider a set of crossed A-plates (e.g., placed with their optic axes offset 90 degrees). It is generally known that if the in-plane retardance of the two plates is approximately matched, the common retardance magnitude of the set will exhibit a negative C-plate effect. This residual negative C-plate retardance component, which may be undesirable, is compensated for by applying a thin film coating having a positive C-plate component to one or both of the A-plates. Optionally, the positive C-plate (PC) thin film coating applied to one or both of the A-plates is incorporated into an AR coating, a LWP coating, or a SWP coating.

Yet another application of the thin film coating described in accordance with the instant invention is as a Berek compensator used in polarized light microscopy. A Berek compensator is a positive C-plate that is used to measure birefringence of a sample in a light microscope. In particular, the C-plate element is oriented with its extraordinary wave optical axis perpendicular to the plane of the positive C-plate element and parallel to the microscope optical axis. Polarized light passing through the positive C-plate at normal incidence (zero degrees) propagates through the positive C-plate with a velocity that is independent upon the direction of polarization. As the positive C-plate element is rotated with respect to the direction of incident polarized light, the velocity of the polarized light becomes polarization dependent and velocity changes. The resulting phase difference, which is dependent on the thickness of the positive C-plate, the incident wavelength, the birefringence, and the tilt angle, is then used to calibrate the microscope and measure the birefringence of a sample. In this application, the positive C-plate thin film coating can be applied directly to a substrate, or can be incorporated into an AR coating, a LWP coating, or a SWP coating deposited on the substrate.

In each of the above examples, the thin-film coatings in accordance with the instant invention are discussed as being optionally incorporated into an AR coating. According to one embodiment, this is achieved by depositing a first AR stack on a substrate, a positive C-plate thin film stack on the first AR stack, and a second AR stack on the positive C-plate thin film stack (i.e., the positive C-plate (PC) is sandwiched between two AR stacks to form a PCAR stack). Notably, when the positive C-plate thin-film stack is of the form $(0.5 \text{ L H } 0.5 \text{ L})^Q$ the PCAR stack is essentially a short wave filter. Conveniently, the retardance versus angle of incidence (AOI) performance of the PCAR stack is readily tailored to enhance functionality, while still maintaining the anti-reflection coating functionality.

In each of the above examples, the thin film coatings in accordance with the instant invention are fabricated using vacuum deposition techniques including, but not limited to chemical vapor deposition (CVD), plasma enhanced CVD, electron beam evaporation, thermal evaporation, sputtering, and/or atomic layer deposition. Optionally, the thin films are deposited on a substrate that is transparent over the wavelength region of interest and, may be made from a wide variety of materials including, but not limited to, glass, quartz, clear plastic, silicon, and germanium. Further optionally, the substrate is incorporated into another optical component. In general, the materials used for the thin films are inorganic or organic dielectric materials having indices of refraction in the range of 1.3 to greater than 4.0 at 550 nm. For example, some suitable materials include silica ($SiO_2$, n=1.46), tantala ($Ta_2O_5$, n=2.20), alumina ($Al_2O_3$, n=1.63), hafnia ($HfO_2$, n=1.85), titania ($TiO_2$, n=2.37), niobia ($Nb_2O_5$, n=2.19), and magnesium fluoride ($MgF_2$, n=1.38). Of course, other dielectric materials and/or polymers would serve as well. Optionally, the filter is designed with the aid of a commercially available computer program such as TFCalc™ by Software Spectra Inc.

Of course, the above embodiments have been provided as examples only. It will be appreciated by those of ordinary skill in the art that various modifications, alternate configurations, and/or equivalents will be employed without departing from the spirit and scope of the invention. For example, reflective embodiments analogous to the above-described transmissive embodiments are also envisioned. In fact, the thin film coatings used in reflection, such as the above-described reflective quarter-wave plate, are expected to be useful in many commercial applications. Accordingly, the scope of the invention is therefore intended to be limited solely by the scope of the appended claims.

The invention claimed is:

1. A method comprising the steps of:
   depositing a thin film coating on a substrate, the thin film coating including a multi-layer stack having a basic period including alternating layers of at least two isotropic materials having contrasting refractive indices, the basic period having an equivalent phase thickness of $\pi$ at a first wavelength $\lambda_0$, and
   selecting a physical thickness and a refractive index of each layer in the basic period to provide a predetermined retardance at a predetermined off-normal angle of incidence at a predetermined second wavelength,
   wherein the multi-layer stack has a retardance of zero for normal-incident rays of light and a retardance dependent on angle of incidence for off-axis rays of light, and
   wherein an equivalent phase thickness of the basic period at the predetermined second wavelength is greater than $\pi$.

2. A method according to claim 1, wherein the physical thickness and refractive index of each layer in the basic period is selected to form a positive C-plate multi-layer stack at the predetermined second wavelength, and wherein the equivalent phase thickness of the basic period at the predetermined second wavelength is greater than $\pi$ and less than $2\pi$.

3. A method according to claim 1, wherein the physical thickness and refractive index of each layer in the basic period is selected to form a negative C-plate multi-layer stack at the predetermined second wavelength, and wherein the equivalent phase thickness of the basic period at the predetermined second wavelength is greater than $2\pi$ and less than $3\pi$.

4. A method according to claim 1, wherein the physical thickness and refractive index of each layer in the basic period is selected to form positive C-plate multi-layer stack at the predetermined second wavelength, and wherein the equivalent phase thickness of the basic period at the predetermined second wavelength is greater than $3\pi$ and less than $4\pi$.

5. A method according to claim 1, wherein depositing the thin film coating on the substrate includes depositing alternating layers of high refractive index and low refractive index dielectric materials.

6. A method according to claim 1, wherein the multi-layer stack is incorporated into one of an anti-reflection coating, a long wavelength pass coating, and a short wavelength pass coating.

7. A method according to claim 1, wherein the multi-layer stack is a multi-layer interference structure centered at the first wavelength $\lambda_0$, and wherein the predetermined second wavelength is lower than $\lambda_0$.

8. A method according to claim 1, wherein depositing the thin film coating on the substrate includes forming a positive C-plate compensating element.

9. A method according to claim 1, wherein depositing the thin film coating on the substrate includes depositing the basic period Q times, and wherein at least one of the first wavelength $\lambda_0$ and Q is selected to provide a predetermined retardance at a predetermined off-normal angle of incidence at the predetermined second wavelength.

10. A method according to claim 1, wherein depositing the thin film coating on the substrate includes depositing the basic period Q times, and wherein at least one of the first wavelength $\lambda_0$ and Q is selected to provide a predetermined retardance profile versus angle of incidence at the predetermined second wavelength.

11. A method according to claim 10, wherein depositing the thin film coating on the substrate includes depositing the multi-layer stack on a waveplate, and wherein the predetermined retardance profile versus angle of incidence is selected for compensating for a variation in retardance with angle of incidence of the waveplate, at the predetermined second wavelength.

12. A method according to claim 11, wherein the multi-layer stack is incorporated into at least one of an anti-reflection coating, a long wavelength pass coating, and a short wavelength pass coating.

13. A method according to claim 10, wherein the predetermined retardance profile versus angle of incidence is selected for compensating for residual negative C-plate retardance of first and second crossed A-plates having different physical thicknesses.

14. A method according to claim 13, wherein the multi-layer stack is incorporated into at least one of an anti-reflection coating, a long wavelength pass coating, and a short wavelength pass coating.

15. A method according to claim 10, wherein the predetermined retardance profile versus angle of incidence is selected for providing C-plate retardance for a Berek compensator.

16. A method according to claim 15, wherein the multi-layer stack is incorporated into at least one of an anti-reflection coating, a long wavelength pass coating, and a short wavelength pass coating.

17. A method according to claim 1, wherein the multi-layer stack provides a same magnitude of retardance at the predetermined second wavelength and a predetermined third other wavelength, for a same angle of incidence.

18. A method according to claim 17, wherein depositing the thin film coating on the substrate includes depositing the multi-layer stack on the substrate to form an achromatic quarter-wave plate for use at an off-normal angle of incidence.

19. A method according to claim 18, wherein the multi-layer stack is incorporated into a reflective filter, and wherein the achromatic quarter-wave plate is a reflective achromatic quarter-wave plate.

20. A method according to claim 1, wherein the multi-layer stack is for custom off-axis compensation requirements in the visible and near infra-red regions of the electromagnetic spectrum.

21. A method according to claim 1, wherein the predetermined second wavelength is within one of the visible and near infra-red regions of the electromagnetic spectrum.

22. A method comprising the steps of:
depositing a thin film coating on a substrate, the thin film coating including a C-plate multi-layer stack having a basic period including alternating layers of at least two isotropic materials having contrasting refractive indices, the basic period having an equivalent phase thickness of $\pi$ at a first wavelength $\lambda_0$; and
selecting a physical thickness and a refractive index of each layer in the basic period to provide a predetermined retardance at a predetermined off-normal angle of incidence at a predetermined second wavelength,
wherein an equivalent phase thickness of the basic period at the predetermined second wavelength is greater than $\pi$.

23. A method according to claim 22, wherein the step of depositing the thin film coating on the substrate includes depositing the thin film coating on a waveplate to improve a field of view of the waveplate.

24. A method according to claim 22, wherein the step of depositing the thin film coating on the substrate includes depositing the thin film coating on an optical component for a polarization sensitive system to provide positive C-plate compensation.

25. A method according to claim 22, wherein the step of depositing the thin film coating on the substrate includes incorporating the multi-layer stack in a reflective filter.

26. A method according to claim 25, comprising the step of orienting the substrate at an angle in a polarized beam of light to provide quarter-wave retardation, the polarized beam of light at the predetermined second wavelength.

27. A method according to claim 22, wherein the step of depositing the thin film coating on the substrate includes incorporating the multi-layer stack in an anti-reflection coating.

28. A method according to claim 22, wherein the step of depositing the thin film coating on the substrate includes depositing the thin film coating on a birefringent element having an in-plane retardance to tailor an angular retardance profile of the birefringent element.

29. A method according to claim 28, wherein the birefringent element is one of a stretched foil, a form-birefringent grating, a crystalline quartz, and a liquid crystal polymer retardation element.

30. A method comprising:

irradiating a thin film coating with light at a predetermined first wavelength, the thin film coating including a C-plate multi-layer stack having a basic period including alternating layers of at least two isotropic materials having contrasting refractive indices, the basic period having an equivalent phase thickness of $\pi$ at a second wavelength $\lambda_0$, a physical thickness and a refractive index of each layer in the basic period selected to provide a predetermined retardance at a predetermined off-normal angle of incidence at the predetermined first wavelength, and an equivalent phase thickness of the basic period at the predetermined first wavelength is greater than $\pi$.

31. A method according to claim 30, wherein the thin film coating is supported by a waveplate, and wherein a phase thickness of the thin-film coating is selected to reduce retardance variation of the waveplate with angle of incidence.

* * * * *